Oct. 30, 1962 R. G. HEYL, JR., ET AL 3,061,372
HIGH LOAD CAPACITY SEAT CONSTRUCTION
Filed Jan. 25, 1960 3 Sheets-Sheet 1
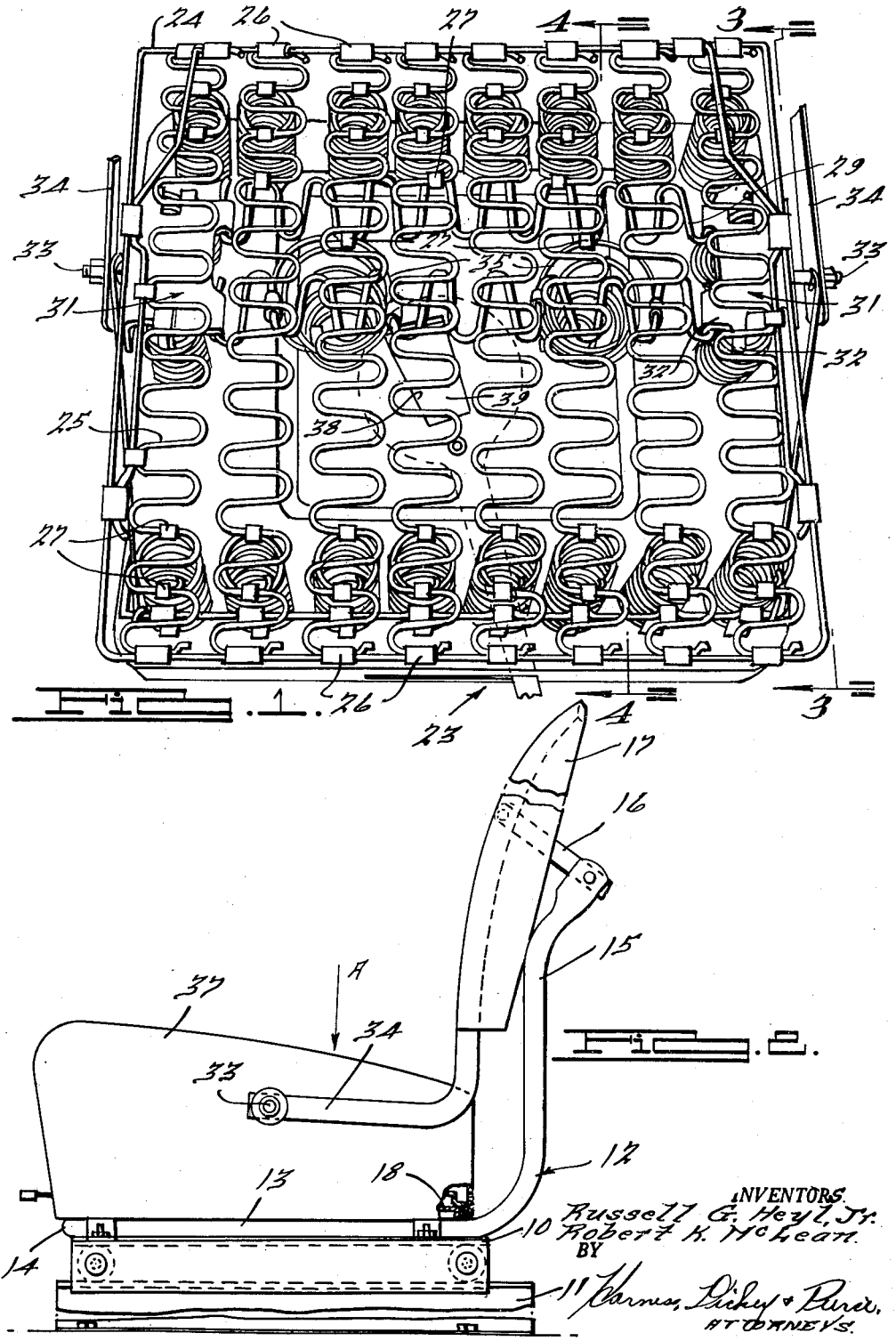
INVENTORS.
Russell G. Heyl, Jr.
Robert K. McLean
BY
Varnum, Dickey & Pierce
ATTORNEYS.

Oct. 30, 1962  R. G. HEYL, JR., ET AL  3,061,372
HIGH LOAD CAPACITY SEAT CONSTRUCTION
Filed Jan. 25, 1960  3 Sheets-Sheet 2

INVENTORS
Russell G. Heyl, Jr.
Robert K. McLean
BY
Harness, Dickey & Pierce
ATTORNEYS Oct. 30, 1962 R. G. HEYL, JR., ET AL 3,061,372
HIGH LOAD CAPACITY SEAT CONSTRUCTION
Filed Jan. 25, 1960 3 Sheets-Sheet 3
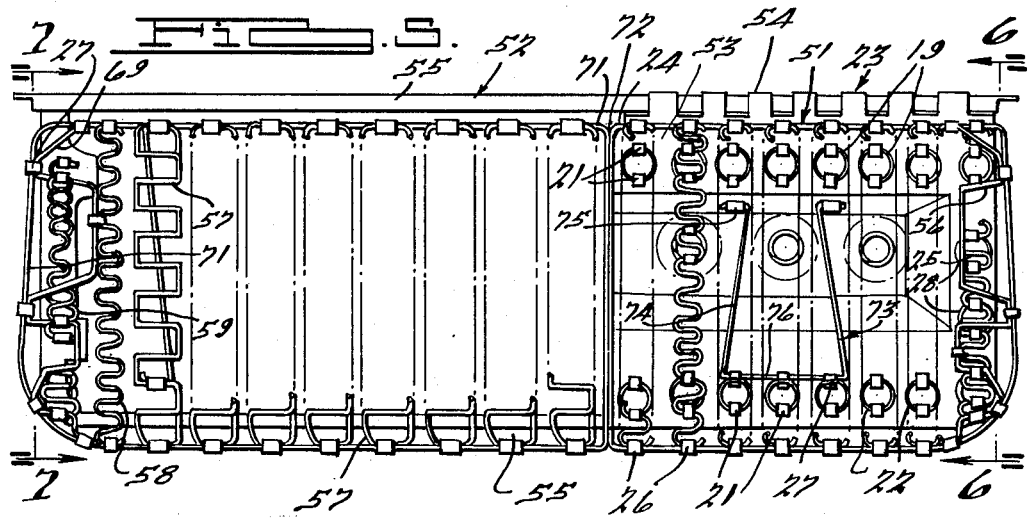
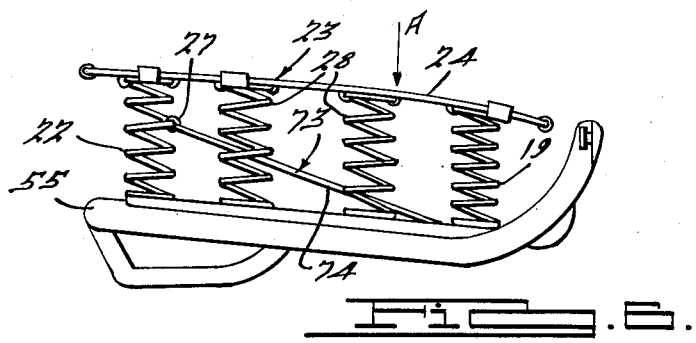
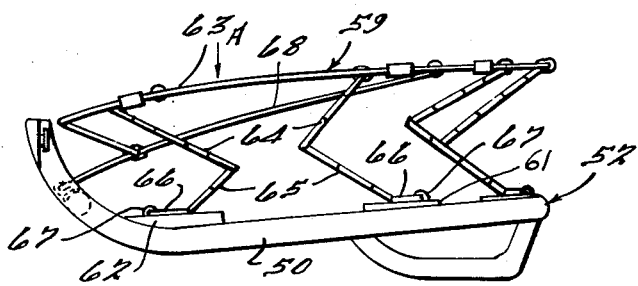
INVENTORS.
Russell G. Heyl, Jr.
Robert K. McLean.
BY
Harness, Dickey & Pierce.
ATTORNEYS.

United States Patent Office 3,061,372
Patented Oct. 30, 1962

3,061,372
HIGH LOAD CAPACITY SEAT CONSTRUCTION
Russell G. Heyl, Jr., Birmingham, and Robert K. McLean, Dearborn, Mich., assignors to American Metal Products Company, Detroit, Mich., a corporation of Michigan
Filed Jan. 25, 1960, Ser. No. 4,454
3 Claims. (Cl. 297—309)

This invention relates to spring seats, and particularly to a spring seat of great rigidity and durability so as to withstand severe usage.

In the copending application of H. C. Flint, Serial No. 698,497, filed November 25, 1957, a unison type of spring seat is illustrated and described comprising a seat cushion constructed to withstand severe service and a seat back connected thereto in a manner to move upwardly and downwardly therewith. The cushion construction embodies a plurality of formed wire springs extending from the front to the rear of the frame to which transverse sinuous springs are secured for supporting pivots at the sides of the assembly to which the forward projecting arms of a seat back frame are pivoted. After the cushion is loaded and moves upwardly and downwardly as the vehicle is moved along the road, the seat back will move upwardly and downwardly therewith and provide substantial comfort to the occupant.

The present invention pertains to a seat structure which is similar to the one of the above mentioned application but which has a seat cushion which provides still greater rigidity and durability to thereby withstand greater shock produced by the operation of a vehicle in off-road service at a time when the driver requires greater support due to greater body movement and shock. The seat cushion has a forward and rearward row of helical coil springs which extend from side to side thereof, so disposed as to support a top load supporting element made from a border wire and a plurality of sinuous springs which may be of the formed or the like looped type, each one of which is aligned with a front and rear coil spring and fixedly secured to the top coil thereof. Additional springs of the helical or conical type may be employed at the A point of the top element to add further strength thereat for adding to the support of the load and controlling the degree of deflection thereof under shock conditions. Pivots may be provided at the side of the cushion unit which preferably is of the bucket seat type for the driver of the vehicle. Such a bucket seat may be employed separately or may be a portion of an entire seat cushion which extends across the frame from one side to the other of the vehicle. The portion of the seat cushion not occupied by the driver may be of less rugged construction than that of the bucket seat supplied for the driver.

An angle-shaped plate is attached to each side of the cushion when the back is to move therewith, having suitable attaching fingers thereon by which it is secured to adjacent spring elements. Transverse sinuous spring elements may be employed on top of or beneath the load supporting element, the ends of which are secured to the plates containing the pivots in fixed relation thereto. The transverse springs not only assist in supporting the plates which have the pivots attached thereto, but at the same time provide additional strength at the central portion of the seating frame to withstand the service to which the frame is placed under extreme stress and shock conditions. Bracing means may be provided for locating the pivots and providing greater stability to the forward projecting ends of the back frame when mounted thereon.

Accordingly, the main objects of the invention are: to provide a seating unit which is exceedingly durable and is capable of withstanding severe shock; to provide a seat having a cushion thereon which has sinuous spring elements forming a top element which is supported on coil springs which are secured to the base frame of the seat unit; to provide a cushion for a seat which is extremely durable so as to withstand shock, having upholstery material secured thereover and to a base pan to provide an air bound area therewithin regulated to a degree to dampen the rebound of an occupant after being moved downwardly with the springs due to shock to the vehicle, and, in general, to provide a seat structure having a cushion which is extremely durable and which is simple in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a seat structure, with the upholstery removed therefrom;

FIG. 2 is a reduced view in side elevation, having parts broken away, of a complete unison seat structure having a cushion thereon constructed in a manner as illustrated in FIG. 1;

FIG. 5 is a plan view of structure showing a spring assembly similar to that of FIG. 1 but which is applied to the driver's side of a seat unit which extends across the width of the vehicle;

FIG. 6 is an enlarged view in elevation of the structure illustrated in FIG. 5, as viewed from the right-hand side thereof, and FIG. 7 is an enlarged view in elevation of the structure illustrated in FIG. 5, as viewed from the left-hand side thereof.

Figure 3:
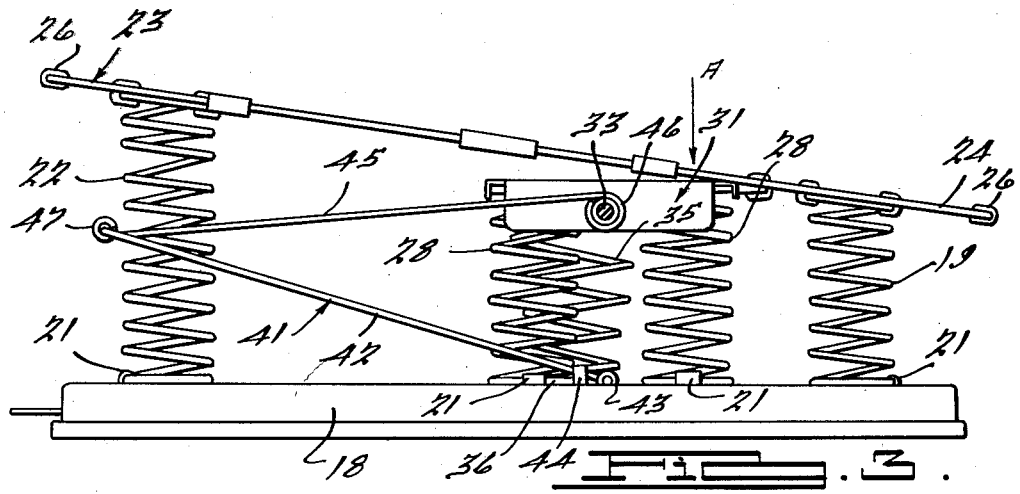
FIG. 3 is an enlarged sectional view of the structure illustrated in FIG. 1, taken on the line 3—3 thereof.
Figure 4:
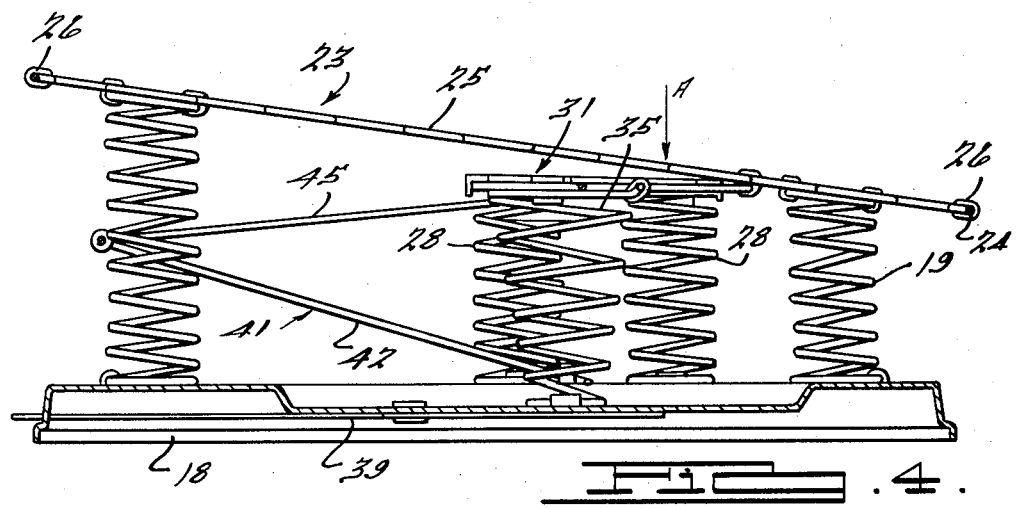
FIG. 4 is an enlarged sectional view of the structure illustrated in FIG. 1, taken on the line 4—4 thereof.

Referring to FIGS. 1 to 4 inclusive, a unison seat structure is illustrated in FIG. 2 as embodying a seat supporting mechanism 10 which is adjustable backwardly and forwardly on a rail element 11 in the conventional manner. A tubular frame 12 is supported on the seat supporting structure 10 by the two side arm portions 13 which extend rearwardly from a forward web 14 and which extend upwardly at 15 for pivotally supporting arms 16 which are pivoted to a back unit 17, as illustrated and described more particularly in the above mentioned copending application. A base pan 18 is secured to the web portion 14 and side portions 13 of the tubular frame 12 to form the base frame of the cushion.

At the rear edge of the base pan 18, a row of coil springs 19 are supported in a suitable manner, herein illustrated as by fingers 21 which are stamped upwardly from the base pan and reversely bent to form hooks which engage the bottom coil of the springs. A similar row of coil springs 22 of greater length are supported at the front end of the base pan 18 by fingers 21.

A top element 23 is made up from a border wire 24 and a plurality of sinuous spring strips 25 which are secured to the front and rear portions of the border wire 24 by clips 26. Each of the spring strips 25 is aligned with a forward and rearward coil spring 19 and 22 and secured thereto by clips 27 which are similar to the clips 26 but smaller in width. A pair of coil springs 28, which are similar to the springs 19 and 22 and of substantially the same height as the springs 19, are secured near the side edge of the base pan 18 by fingers 21, to support the ends of a pair of laterally disposed sinuous springs 29. The rearmost strip 29 is secured to certain of the spring strips 25 by clips 27. With this arrangement, the spring strips 25 of the top element 23 deflect a substantial distance before engaging and cause the spring strips 29 to deflect therewith.

It is to be understood that in certain arrangements both of the springs 29 could be secured to the under side of the top element 23 or upon the top thereof, depending upon the height of the cushion and the action which is desired when withstanding the severe shock to which the cushion is subjected during the off-road operation of the vehicle. An angle plate 31 is secured at each side of the cushion assembly and to the ends of the sinuous spring strips 29 and the coil springs 28. The plates have a plurality of fingers 32 which are coiled about the top coil of the springs 28 and also about lateral portions of the spring strips 29. The downwardly extending portion of the angle plates 31 has a stud 33 fixed thereto which extends outwardly thereof in position to receive the forwardly extending arm 34 of the back frame located at each side of the cushion.

In the present arrangement, a certain amount of deflection will occur to the spring strips of the top element 23, after which a substantial portion of the load will be carried by the transversely disposed strips 29, causing the back unit 17 to move upwardly and downwardly with the transverse springs 29 and the springs of the top frame 23. This unison action provides substantial comfort to the seat occupant and the seat structure is able to support a substantial load under shock conditions. To provide further support to the central rear portion of the seat which assumes the greatest load, additional coil springs 35 are secured to the base pan 18 by suitable fingers 36 and to the transverse spring strips 29 by clips 27.

Upholstery material 37 is secured over the cushion unit as illustrated in FIG. 2 in air-tight relation to the pan 18 so as to provide an air lock to the area within the upholstery material which restricts the rebound of the springs. An aperture 38 may be provided in the area of the pan within the material 37 for controlling the passage of air to and from the area within the spring cushion. An adjustable plate 39 may be provided for regulating the effective size of the aperture if this is desired. It was found from use that an aperture substantially the size of that illustrated provides the damping effect for the seat cushion.

To produce stability to the pivots 33, a U-shaped wire element 41 extends across the front of the assembly forwardly of the row of springs 22, with the side arm portions 42 extending rearwardly and downwardly, with the ends inwardly projecting and extending within apertures formed by the offset pan portion 43. Upwardly extending tabs 44 secure the inwardly projecting ends of the arm portions 42 against outward movement from the aperture formed by the offset pan portion 43. A link 45 is provided at each side of the cushion, having a rearward coiled portion 46 which extends over the pivot 33 and a forward coiled portion 47 disposed about the front portion of the U-shaped wire element 41. This arrangement accurately locates the pivots 33 and prevents them from moving forwardly and rearwardly while permitting the pivots to move upwardly and downwardly as the springs 28 are deflected.

In FIG. 5, a further form of the invention is illustrated, that wherein a bucket seat type of cushion unit 51, similar to the unit illustrated in FIG. 1, is disclosed. This unit is supported upon a standard type of frame 52 which is normally employed on a front cushion which extends across the width of the vehicle body. A pan 53 has projecting fingers 54 which are wound about the rear tubular element 55 of the frame to fix the base pan 53 thereon and on the right hand portion of the frame. A rear row of coil springs 19 and a front row of coil springs 22 are secured to the pan 53, and a top frame 23 is secured thereto in the manner above described. The top frame unit has the right-hand portion thereof reinforced by a wire bracing element 56 and secured to the endmost sinuous spring strip 25 which rests upon the pair of coil springs 28. Substantial support is provided for the right-hand edge of the complete cushion as illustrated in the figure.

Spring strips 57 are employed in the left-hand portion of the seat frame 52 in the conventional manner. These spring strips may be of uniform sinuous form or may be of the formed type having varying rectangular types of loops for the supporting surface thereof. Coiled or V-shaped end portions are disposed below the front and rear end of the strips and attached to the frame. The left-hand end of the assembly as illustrated in FIGS. 5 and 7 has a uniform sinuous spring strip 58 secured near the ends of the tubular elements of the frame 52 in the conventional manner. The endmost spring unit 59 is supported on base elements 61 and 62 secured to the lefthand side element 50 of the tubular frame 52. The element 59 has a top portion 63, converging downwardly forming extending arm portions 64 with diverging arm portions 65 extending downwardly therefrom and provided with securing portions 66 at the ends extending into tunnel elements 67 on the base element 61 and 62. The unit 57 has a brace rod 68 therein, the entire unit 58 being similar to that disclosed and claimed in the patent of H. C. Flint, No. 2,684,844, issued July 27, 1954. A reinforcing filler element 69 is employed at the left-hand end of the frame, being secured to a border wire 71 which surrounds the left-hand portion of the seating and to the sinuous spring strip 58 by clips 27.

The entire unit may be upholstered in the conventional manner and a partition strip provided between the adjacent portions of the border wires 24 and 71 in the space 72 between the cushion units to air-bind the right-hand cushion portion. To provide stability to this right-hand cushion portion when the transverse spring elements 29, the angle plates 31 and pivots 32 are not employed thereon and a unison seat back for the driver side, as illustrated specifically in the above mentioned application, is not incorporated in the seat, a U-shaped bracing rod 73 has downwardly extending ends 74 which project into tunnel elements 75 in the pan 53. The transverse front portion 76 of the U-shaped spring element is secured to the coil springs 22 intermediate their ends by the clips 27. It is to be understood that the sinuous springs 25 need not be aligned with the coil springs 19 and 22 at the rear and forward portions of the cushion, respectively, but that other sinuous strips may be applied to the top of the coil springs of the rows and the sinuous strips 25 secured thereto without being disposed in alignment therewith.

What is claimed is:

1. In a seat cushion, a base, rows of coil springs at the front and the rear edges of the base, a unit primary load supporting element made from spring strips having the edges secured to the front and rear sections of a wire border frame, means for supporting the front and rear portions of the load supporting element upon the tops of the coil springs, with a coil spring at the front and the rear aligned with a spring strip of the load supporting element, at least one coil spring at each side of the base between the front and rear rows of coil springs, and pivot means supported on the coil springs at the side of the base.

2. In a seat construction, a frame of a width to extend across the width of a vehicle, the driver's side of said frame having a pan thereon providing a closed area, a seat cushion mounted on said pan embodying a row of coiled springs at the rear and at the forward end of said pan, a load supporting element comprising a plurality of sinuous strips, a border element secured to the ends of the spring strips forming a separate unit, means securing the spring strips to aligned front and rear coiled springs inwardly of said border element, spring elements mounted upon the frame on the passenger side of the seat, and upholstery material covering the springs on the driver and passenger sides of the frame.

3. In a seat structure, a frame, a seat cushion mounted on said frame and embodying a row of coil springs at the rear and forward ends of said frame, and a primary load supporting element comprising a plurality of sinuous springs secured to a border element with each sinuous spring supported directly on aligned front and rear coiled springs inwardly of said element.

References Cited in the file of this patent

UNITED STATES PATENTS

| | | |
|---|---|---|
| 203,023 | Fitch | Apr. 30, 1878 |
| 2,234,253 | Hopkes | Mar. 11, 1941 |
| 2,260,627 | Krakauer | Oct. 28, 1941 |
| 2,360,966 | Mouw | Oct. 24, 1944 |
| 2,675,065 | Keller | Apr. 13, 1954 |
| 2,719,578 | Flint | Oct. 4, 1955 |
| 2,832,397 | Premo | Apr. 29, 1958 |
| 2,925,120 | Flint | Feb. 16, 1960 |

FOREIGN PATENTS

| | | |
|---|---|---|
| 7,130 | Netherlands | June 15, 1922 |
| 802,580 | Great Britain | Oct. 8, 1958 |